United States Patent [19]

Skinner et al.

[11] 4,199,157
[45] Apr. 22, 1980

[54] TWO PART SLEEVE GASKET

[75] Inventors: Harry W. Skinner; Fouad M. Deeb, both of Fort Wayne, Ind.

[73] Assignee: Press-Seal Gasket Corporation, Fort Wayne, Ind.

[21] Appl. No.: 913,596

[22] Filed: Jun. 8, 1978

[51] Int. Cl.$^2$ .................... B23P 11/02; F16J 15/32
[52] U.S. Cl. .................... 277/190; 277/101; 277/DIG. 2
[58] Field of Search .......... 277/207, DIG. 2, DIG. 3, 277/101, 190, 191

[56] References Cited

U.S. PATENT DOCUMENTS

| | | | |
|---|---|---|---|
| 2,935,349 | 5/1960 | Burch | 277/190 |
| 3,406,988 | 10/1968 | Jones . | |
| 3,474,586 | 10/1969 | Hoverman | 52/403 |
| 3,567,233 | 7/1968 | Stepanich | 277/190 |
| 3,572,774 | 3/1971 | Sipler | 277/101 |
| 3,656,771 | 4/1972 | Stout | 277/207 A |
| 3,700,265 | 10/1972 | Dufour . | |
| 3,759,280 | 9/1973 | Swanson . | |
| 3,866,925 | 2/1975 | Mainstrom . | |
| 3,874,063 | 4/1975 | Skinner | 277/190 |
| 3,958,280 | 5/1976 | Smith . | |
| 3,973,783 | 8/1976 | Skinner | 277/190 |

FOREIGN PATENT DOCUMENTS 807205 1/1959 United Kingdom .............. 277/DIG. 2

*Primary Examiner*—Robert L. Smith
*Attorney, Agent, or Firm*—Gust, Irish, Jeffers & Hoffman

[57] ABSTRACT

A two part sleeve gasket is provided for sealing between a pipe and a hole receiving the pipe, such as a porthole in a manhole. The gasket includes a first annular element of resilient elastomeric material having a generally tubular body portion and an outwardly, reflexly curved flange radially spaced therefrom. The flange is generally tubular and shorter in length than the body portion. A second annular element resembling an O-ring of elastomeric material surrounds the body portion in the radial space defined by the flange, the flange being radially flexible into engagement with the wall of the hole and the second annular element being elastically deformable upon being radially compressed between the flange and the body portion. The invention also comprehends the method of installing the aforesaid gasket. The method includes the steps of telescoping the tubular body portion over the pipe, inserting the pipe with the tubular element thereon into the opening with the flange loosely engaging the wall of the hole, and forcing the second annular element of resilient elastomeric material which surrounds the pipe into the radial space between the flange and the body portion, the second annular element being of a cross sectional size greater than the free radial space between the flange and the body portion when both are engaged with the wall of the hole and the pipe, respectively, whereby the flange and the body portion are forcefully expanded into sealing engagement with said wall and pipe.

7 Claims, 12 Drawing Figures

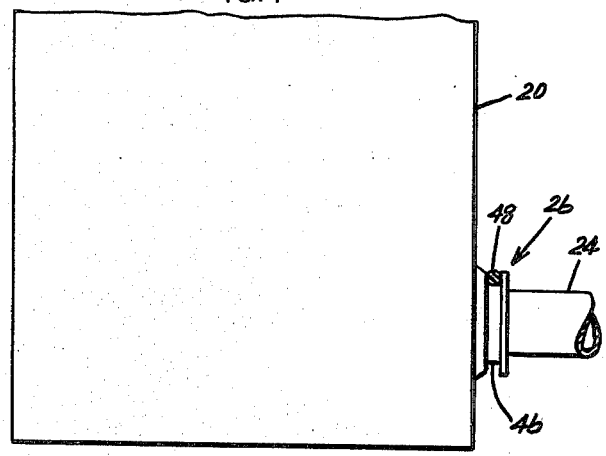
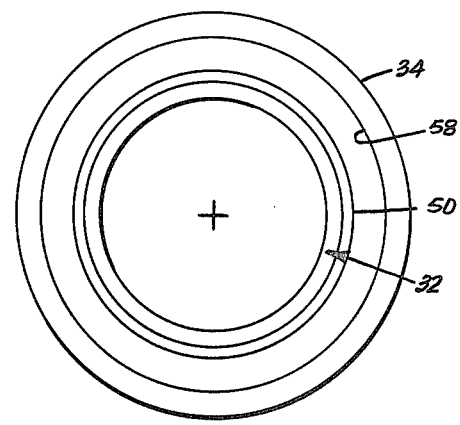
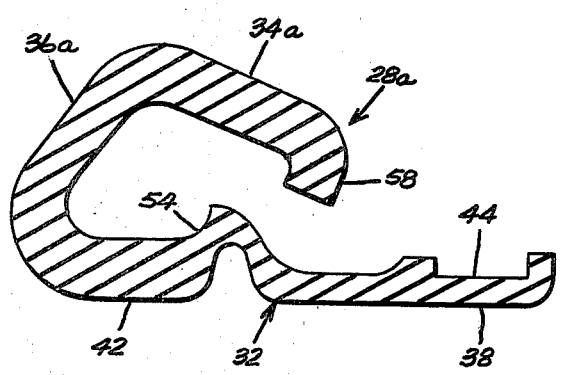
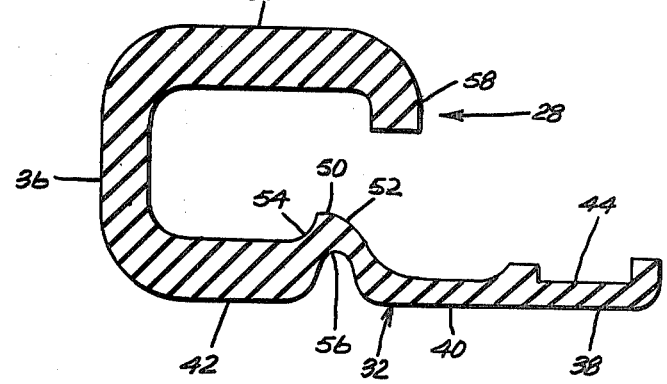
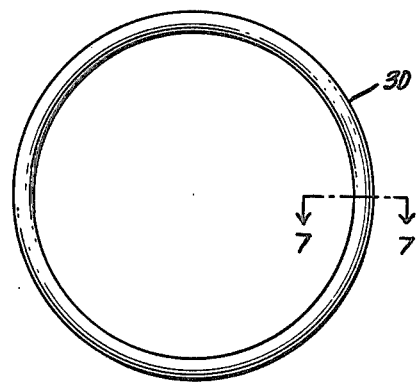
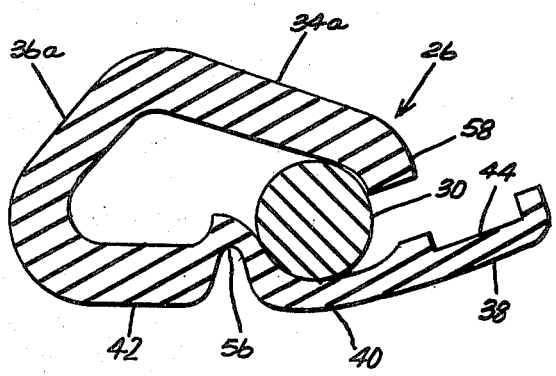
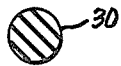

TWO PART SLEEVE GASKET

BACKGROUND OF THE INVENTION

1. Field of the Invention

This invention relates to pipe joint sealing devices and more particularly to the sealing of pipes to holes in members such as manholes.

2. Description of the Prior Art

Prior art patents bearing some similarity to the present invention include U.S. Pat. Nos. 3,406,988; 3,656,771; 3,700,265; 3,759,280; 3,866,925; 3,958,280 and 3,973,783. These patents variously relate to the provision of annular elastomeric resilient gaskets which sealingly fit between the end of a pipe and an opening or hole in another member, such as a manhole, for preventing leakage between the hole and the exterior of the pipe. In particular, U.S. Pat. Nos. 3,406,988; 3,759,280 and 3,958,313 disclose the use of sleeve-like gaskets having the exteriors at one end sealed to the wall of the hole and the opposite end sealed to either the interior or exterior of a joined pipe. The sealing of the one end to the wall of the hole is also variously achieved, one technique being to cast a radial flange on the sleeve into the wall of concrete, and another being to clamp this flange against the exterior of the wall around the hole by means of a steel or the like clamping ring. Still another arrangement involves inserting the gasket loosely into a hole followed by inserting an expansible split, clamping ring inside the gasket and then radially forcing the ring into an enlarged, expanded size for radially compressing and sealing the gasket against the wall of the hole. A still further arrangement is to drive a tapered tubular wedge into the gasket after being loosely installed in the hole for radially compressing the gasket against the wall of the hole. Yet another arrangement, more particularly shown in U.S. Pat. No. 3,973,783, comprehends the use of a wedge having an annular recess which is adapted to receive an annular expansion wedge of elastomeric material for forcefully engaging the gasket against radially opposite portions of the pipe and wall.

SUMMARY OF THE INVENTION

In accordance with the broader aspects of this invention, there is provided a sleeve-like gasket device for sealing between a pipe and a hole receiving the pipe. The gasket includes a first annular element of resilient elastomeric material having a generally tubular body portion and an outwardly, reflexly curved flange radially spaced therefrom. The flange is generally tubular and of an axial length shorter than the body portion. A second annular element of resilient elastomeric material surrounds the body portion in the radial space defined by the flange, the flange being radially flexible into engagement with the wall of the hole and the second annular element being elastically deformable upon being radially compressed between the flange and the body portion. A seal is thus provided in the space between the pipe and the wall of the hole.

In accordance with the method of this invention, the tubular body portion is telescoped over the pipe, the pipe with the tubular element thereon is inserted into the hole with the flange loosely engaging the wall of the hole, and then forcing the second annular element which has been previously telescoped onto the pipe or tubular body portion into the radial space between the flange and the body portion. The second annular element is of a cross sectional size greater than the free radial space between the flange and body portion when both are engaged with the wall of the hole and the pipe, respectively, whereby the flange and body portion are forcefully expanded into sealing engagement with the wall and pipe. The distal end of the tubular body portion is forcefully clamped onto the pipe thereby completing the installation of the gasket.

It is an object of this invention to provide a gasket for sealing between the wall of an opening and a pipe inserted thereinto.

It is another object of this invention to provide a resilient, elastomeric gasket which may be easily installed, permit some movement of the pipe with respect to the opening into which is inserted without disrupting the seal, and is frictionally retained in place.

It is still another object of this invention to provide a gasket device which seals against radially opposite portions of a wall of an opening and a pipe inserted thereinto and also to the pipe itself at a location remote from the hole.

A further object is to provide a gasket which permits some angular movement of the pipe without disrupting the seal, one portion of the gasket being mechanically clamped around the pipe by means of a clamping band.

Yet another object of this invention is to provide a method of installing a two part gasket for sealing around a pipe inserted into a companion opening.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevation in fragmentary form of one embodiment of this invention showing a pipe sealed into the porthole of a manhole;

FIG. 2 is a cross section of one embodiment of the sleeve-like gasket of this invention;

FIG. 3 is a front view of the embodiment of FIG. 2;

FIG. 4 is a cross section like that of FIG. 2 showing a slightly different embodiment of this invention;

FIG. 5 is a cross section like FIG. 4 but with a second part of the gasket device in preassembled position;

FIG. 6 is a side view showing one of the parts of FIG. 5;

FIG. 7 is a section taken substantially along section line 7—7 of FIG. 6;

DESCRIPTION OF THE PREFERRED EMBODIMENT

Figure 8:
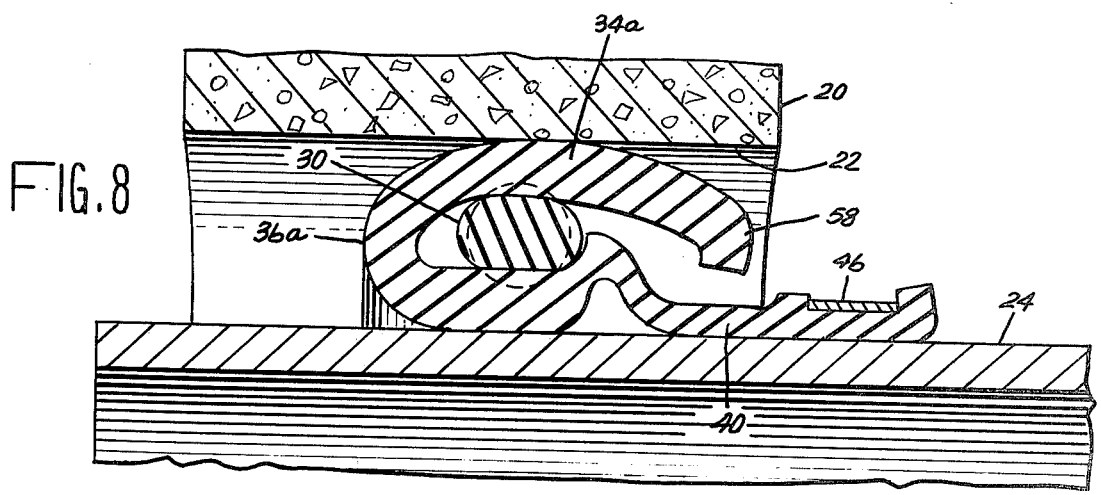
FIG. 8 is a fragmentary axial section of a gasket device of FIG. 5 installed in the radial space between the end of a pipe and the wall of a porthole in the manhole of FIG. 1.
Figure 9:
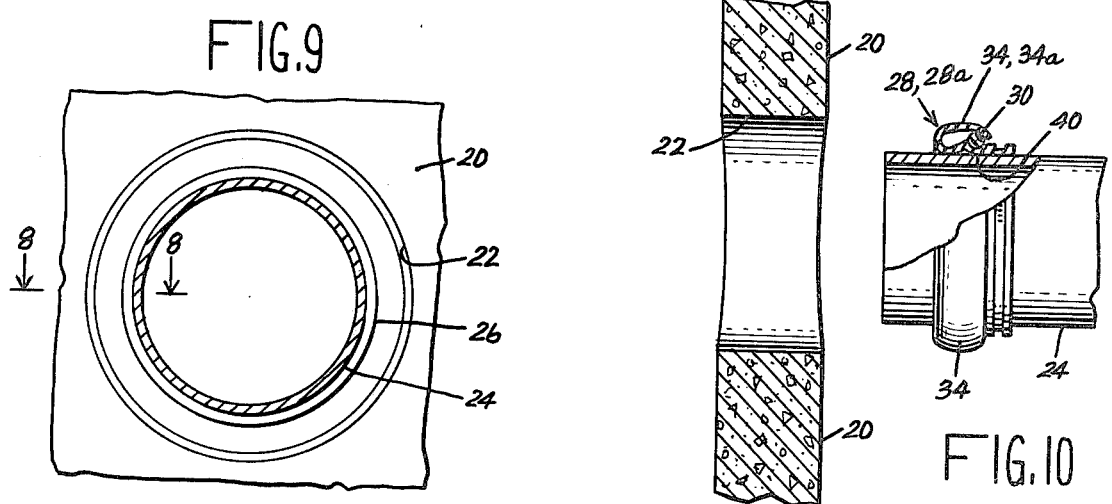
FIG. 9 is a front view of the arrangement of FIG. 8 showing the pipe in cross section.

Referring to the drawings, and more particularly to FIGS. 1, 8, 9 and 10 through 12, a conventional manhole 20 has a porthole 22 of circular shape which coaxially receives the end portion of a concrete or the like pipe 24. The gasket device of this invention indicated generally by the reference numeral 26 is sealingly installed in the annular space between the pipe 24 and the hole 20 as shown more clearly in FIGS. 8, 9 and 12.

The gasket device 26 is in essentially two parts, a sleeve-like element 28 of FIG. 2 and 28a of FIG. 4, and a second element in the form of an O-ring 30 (FIGS. 6 and 7). The elements 28, 28a and 30 are formed of a suitable resilient elastomeric material, such as rubber, neoprene or other suitable plastic. Referring first to the element 28 of FIG. 2, it includes a tubular body portion 32 and an outwardly, reflexly curved flange 34. The flange 34 is radially spaced from the body portion 32 in substantial parallelism therewith, an annular connecting portion 36 extending between the flange 34 and body portion 32.

The tubular body portion 32 is formed of three joined portions 38, 40 and 42. The portion 38 contains an annular groove 44 for receiving a threadedly adjustable clamping band indicated in FIGS. 1 and 8 by the numeral 46. This clamping band may be the same as that employed in U.S. Pat. Nos. 3,759,280 and 3,958,313, preferably having a threaded adjuster 48 engageable by means of a screwdriver for tightening the end portion 38 of the gasket sealingly around the periphery of a pipe 24.

The body portions 40 and 42, as is clearly shown in FIG. 2 which is substantially to scale, are of different wall thicknesses, the thickness of portion 40 being less than half of that of the portion 42. The thicknesses of the walls of connecting section 36 and flange 34 preferably are equal to that of the portion 42.

Joining the portions 40 and 42 is radially outwardly extending annular rib or ridge 50 smoothly convexly curved in cross section at 52 but concavely curved at 54. The body portion 32 has an annular recess 56 opposite the annular ridge 50 whereby the ridge 50 can be conveniently flexed radially.

The distal end of the flange 34 is provided with a radially inwardly turned, annular lip 58 which extends just beyond the ridge 50 as shown.

The sleeve elements of the remaining figures, such as FIGS. 4 and 5, are constructed identically to that of FIG. 2 with the exception that the preformed shape of the flange 34a and the connecting section 36a are as shown.

Figure 10:
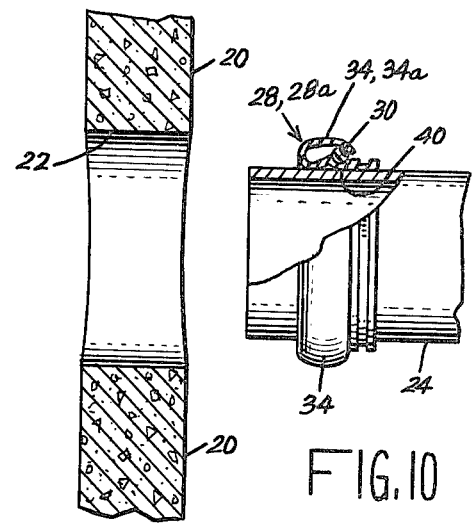
FIG. 10 is a fragmentary view partly sectioned of an embodiment of this invention showing the first step in the method of installing the gasket.
Figure 11:
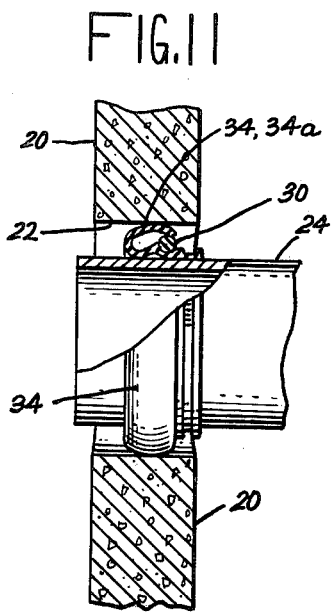
FIG. 11 is a similar view showing a second step.
Figure 12:
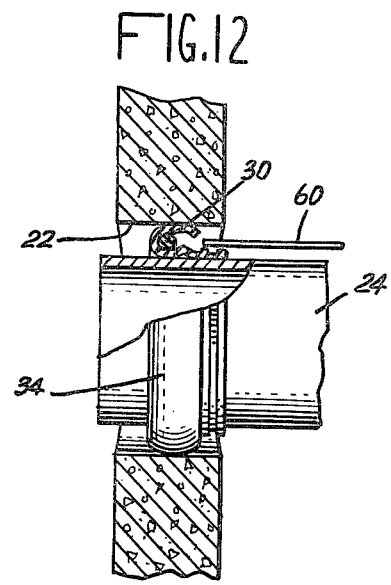
FIG. 12 is a similar view showing the gasket finally installed.

The method of installing the gasket is shown in FIGS. 10, 11 and 12. Either of the sleeves of FIGS. 2 and 4 may be used.

The first step, shown in FIG. 10, includes telescoping the sleeve element 28, 28a onto the pipe 24 to the position shown. Preferably but not necessarily, the inside diameter of element 28, 28a is only slightly smaller than the outside diameter of the pipe 24 such that the element 28 snugly surrounds the pipe.

The O-ring 30 is next telescoped over the pipe 24 and onto the body portion 40 contiguous with the ridge 50. The lip 58 of the flange 34, 34a (see FIGS. 5 and 8) is engaged with the O-ring 30 as shown more clearly in FIG. 5, to hold the O-ring in place.

With the O-ring 30 so positioned, the pipe 24 with the gasket assembly thereon is inserted into the porthole 22 to the position shown in FIG. 11. This is easily accomplished inasmuch as the radial thickness of the flange 34, 34a, the ring 30 and the body portion 40 permits flexure of flange 34, 34a to provide for loose insertion.

The final step as shown in FIG. 12 involves the use of a hammer handle or rod 60 which is used to force the O-ring 30 over the ridge 50 and into the space between the flange 34, 34a and body portion 42. The handle 60 is used to force incremental portions of the ring 30 into this radial space, the process being repeated circumferentially about the pipe 24 until the entire O-ring 30 is in the position shown in FIGS. 8 and 12.

In this position, and as more clearly shown in FIG. 8, the radial thickness of flange 34, the ring 30 and body portion 42 is greater than the radial space between the pipe 24 and the wall of the opening 22. This results in the ring 30 as well as the flange 34, 34a and the body portion 42 deforming and because of the natural resilience, expanding into tight, sealing engagement with the wall of the opening 22 and the exterior surface of the pipe 24.

The clamping ring 46, 48 may be installed during the step depicted by FIGS. 10 or 12. Once installed, a fluid tight seal is provided which is not disrupted even though the pipe 24 may be tilted or angled to a limited degree with respect to the opening 22.

A doubly effective seal is provided. The first portion of this seal results from the tight engagement of the flange 34, 34a, the O-ring 30 and the body portion 32 between the wall of the opening 22 and the pipe 24 and, secondly, the clamping ring about the distal end portion 48 of the gasket. Thus, the gasket is tightly and sealingly mounted by friction in place with little chance of accidental blow-out, infiltration or exfiltration.

While there have been described above the principles of this invention in connection with specific apparatus, it is to be clearly understood that this description is made only by way of example and not as a limitation to the scope of the invention.

What is claimed is:

1. A gasket device for providing a seal between a pipe and a hole receiving the pipe comprising a first element of resilient elastomeric material having a generally tubular body portion and an outwardly reflexly curved flange radially spaced therefrom, said flange being generally tubular, and a second annular element of resilient elastomeric material surrounding said body portion in the radial space defined by said flange, said flange being of an axial dimension longer than the cross-sectional size of said second element, said flange being radially flexible into engagement with the wall of the hole and said second annular element being resiliently deformable upon being radially compressed between said flange and said body portion, said body portion having an annular flexible rib on said body portion intermediate the ends thereof which projects radially outwardly therefrom, and the wall thickness of said body portion opposite said flange being of a thickness greater than that on the side of said rib opposite the flanged end, the distal end portion of said flange overlying the thicker and a part of the thinner portions of said body portion.

2. The gasket device of claim 1 wherein the wall thickness of said flange is substantially equal to the thickness of the radially opposite portion of said body portion, the distal end of said body portion having an annular groove for receiving a clamping ring.

3. A gasket device for providing a seal between a pipe and a hole receiving the pipe comprising a first element of resilient elastomeric material having a generally tubular body portion and an outwardly reflexly curved flange radially spaced therefrom, said flange being generally tubular, and a second annular element of resilient elastomeric material surrounding said body portion in the radial space defined by said flange, said flange being of an axial dimension longer than the cross-sectional size of said second element, said flange being radially flexible into engagement with the wall of the hole and said second annular element being resiliently deformable upon being radially compressed between said flange and said body portion, said body portion having an annular flexible rib on said body portion intermediate the ends thereof which projects radially outwardly therefrom, and said rib being smoothly curved convexly outwardly in cross section on the side thereof toward the distal end of said body portion opposite said flanged end.

4. The gasket device of claim 3 wherein the distal end of said flange is generally radially opposite said rib, the distal end of said flange having a radially inwardly projecting annular lip.

5. The gasket device of claim 3 wherein said body portion has an annular groove in the inner surface thereof radially opposite said rib thereby providing for radial flexibility of said rib, the said of said rib facing the flange end of said body portion being curved concavely inwardly.

6. A gasket device for providing a seal between a pipe and a hole receiving the pipe comprising a first element of resilient elastomeric material having a generally tubular body portion and an outwardly reflexly curved flange radially spaced therefrom, said flange being generally tubular, and a second annular element of resilient elastomeric material surrounding said body portion in the radial space defined by said flange, said flange being of an axial dimension longer than the cross-sectional size of said second element, said flange being radially flexible into engagement with the wall of the hole and said second annular element being resiliently deformable upon being radially compressed between said flange and said body portion, said body portion having an annular flexible rib on said body portion intermediate the ends thereof which projects radially outwardly therefrom, and said body portion has an annular groove in the inner surface thereof radially opposite said rib thereby providing for radial flexibility of said rib.

7. A gasket device for providing a seal between a pipe and a hole receiving the pipe comprising a first element of resilient elastomeric material having a generally tubular body portion and an outwardly reflexly curved flange radially spaced therefrom, said flange being generally tubular, and a second annular element of resilient elastomeric material surrounding said body portion in the radial space defined by said flange, said flange being of an axial dimension longer than the cross-sectional size of said second element, said flange being radially flexible into engagement with the wall of the hole and said second annular element being resiliently deformable upon being radially compressed between said flange and said body portion, a pipe received by said body portion, a member having a hole therein of a diameter larger than said pipe, the flanged end of said gasket being received in the radial space between said pipe and the wall of said hole, said second element being deformably resiliently compressed between said flange and body portion thereby radially expanding said flange and body portion into sealing engagement with said pipe and hole wall, said second element being preformed to be circular in cross-section but is flattened when compressed as aforesaid, and means for clamping the distal end of said body in sealing relation around said pipe, said body portion extending beyond said flange and having an annular rib on the outer periphery radially opposite the distal end portion of said flange thereby to retain said second element against dislodgment.

* * * * *